US012725582B1

(12) United States Patent
Chen et al.

(10) Patent No.: US 12,725,582 B1

(45) Date of Patent: Sep. 1, 2026

(54) MULTISTABLE DISPLAY

(71) Applicant: GENETOUCH CORP., Taoyuan City (TW)

(72) Inventors: Cheng-Yu Chen, Taoyuan City (TW); Ching-Lung Li, Taoyuan City (TW); Chi Lee, Taoyuan City (TW)

(73) Assignee: GENETOUCH CORP., Taoyuan City (TW)

( * ) Notice: Subject to any disclaimer, the term of this patent is extended or adjusted under 35 U.S.C. 154(b) by 0 days.

(21) Appl. No.: 19/334,442

(22) Filed: Sep. 19, 2025

(30) Foreign Application Priority Data

Apr. 1, 2025 (TW) ................................ 114112625

(51) Int. Cl.
*G09G 3/36* (2006.01)
*G09G 3/20* (2006.01)

(52) U.S. Cl.
CPC ......... *G09G 3/3611* (2013.01); *G09G 3/2092* (2013.01); *G09G 2330/021* (2013.01)

(58) Field of Classification Search
CPC ............... G09G 3/3611; G09G 3/2092; G09G 2330/021
See application file for complete search history.

(56) References Cited

U.S. PATENT DOCUMENTS

2003/0033417 A1 2/2003 Zou et al.
2009/0256868 A1* 10/2009 Low ...................... G06F 3/0481 345/204
2010/0156878 A1* 6/2010 Chen .................... G09G 3/3611 345/212
2012/0133627 A1* 5/2012 Moon .................. G09G 3/3648 345/94
2016/0335942 A1* 11/2016 Cho ..................... G09G 3/2007
2023/0335072 A1* 10/2023 Yao ......................... G02F 1/137

FOREIGN PATENT DOCUMENTS

CN 105280142 A 1/2016
CN 109817142 A 5/2019
TW 552575 B 9/2003
TW 559771 B 11/2003
TW 202312135 A 3/2023

* cited by examiner

*Primary Examiner* — Premal R Patel
(74) *Attorney, Agent, or Firm* — RABIN & BERDO, P.C.

(57) ABSTRACT

A multistable display includes a timing controller circuit, a driver circuit, and a panel. The timing controller circuit generates a time controller signal. The time controller signal includes a header setting signal and a voltage waveform data. The driver circuit stores a voltage configuration truth table, configures the voltage configuration truth table according to the header setting signal, and determines a driver voltage waveform outputted to the panel according to the voltage waveform data and the voltage configuration truth table. As the driver voltage waveform is transmitted by only 1-bit binary code, an amount of bits needed to transport is therefore drastically decreased. Namely, under a same condition of transporting a same amount of bits within a same time, the driver circuit can drive the panel at a lower clock rate, thus decreasing power consumption.

10 Claims, 9 Drawing Sheets

CONTENT
VOLTAGE
WAVEFORM DATA
1122

POSITIVE CONTENT VOLTAGE
WAVEFORM INFORMATION
1122+
x
NEGATIVE CONTENT VOLTAGE
WAVEFORM INFORMATION
1122-
1122

1122a
1122b
1 0 x 0 1 x 1 0 x 0 1
1122

102
dpn

MULTISTABLE DISPLAY

CROSS-REFERENCE TO RELATED APPLICATION(S)

This application claims the priority benefit of TW application serial No. 114112625 filed on Apr. 1, 2025, the entirety of which is hereby incorporated by reference herein and made a part of the specification.

BACKGROUND OF THE INVENTION

1. Field of the Invention

The present invention relates to a display, more particularly a multistable display with a low clock rate.

2. Description of the Related Art

A conventional multistable display, such as a cholesteric liquid crystal display (ChLCD), has liquid crystals with bistable displaying properties. As such, various sets of different voltages are required to drive the conventional multistable display for displaying a frame. For example, the conventional multistable display includes a panel, and each pixel on the panel is intersected by a plurality of line electrodes and a plurality of pixel electrodes Furthermore, in the panel, a liquid crystal layer is mounted between the line electrodes and the pixel electrodes. When driving the panel, voltages are applied to the line electrodes and the pixel electrodes, thus configuring a location corresponding to a pixel to have a specific voltage difference across the liquid crystal layer, and allowing the liquid crystal within the liquid crystal layer to correspondingly rotate to a specific angle.

As various sets of different voltages are required to drive the conventional multistable display, a control signal of the conventional multistable display, however, requires a plurality of bits to transport control data that dictates the various sets of different voltages required for each of the pixels. In other words, the control signal of the conventional multistable display cannot simply use one single bit to represent the various sets of different voltages required for each of the pixels. For example, conventionally, the control data used for dictating the various sets of different voltages required for each of the pixels is transported in 3 bits. This means that, each time the various sets of different voltages required for one pixel are modified, 3 bits of the control data need to be transported.

The conventional multistable display further includes a timing controller circuit (TCON) and a driver circuit (driver IC). The timing controller circuit is configured to generate a time controller signal to the driver circuit. The driver circuit is configured to generate pixel driving signals to the line electrodes and the pixel electrodes according to the time controller signal, thus driving the conventional multistable display to display a frame.

The timing controller circuit, conventionally, includes a clock (clk) signal output port, a display output enable control port (doe), a display output ground control port (dog), a digital to analog control port (d2a), a display start pulse control port (dsp), and a plurality of data output ports (data). The clk signal output port, the display output enable control port (doe), the display output ground control port (dog), the digital to analog control port (d2a), the display start pulse control port (dsp), and the data output ports (data) are connected to the driver circuit (driver IC) for transporting the control signal. Particularly, a frequency of a clock signal outputted from the clk signal output port greatly affects an overall power consumption of the conventional multistable display, i.e. the higher the frequency of the clock signal, the greater the overall power consumption of the conventional multistable display would be.

For example, for the conventional multistable display with Full HD resolution of 1920×1080, when using single data rate (SDR) for transporting the control signal, each cycle of the clock signal is able to include and transport control data for 2 pixels, and thus in other words, the pixel per clock is 2. Furthermore, a transportation time ($T_{line}$) is configured to be 5 milliseconds (ms). The control data corresponding to each of the pixels is transported in 3 bits. Overall, as the control data corresponding to each of the pixels requires 3-bit transportation, and as the pixel per clock is 2, a number of the data output ports (data) equals a number of bits required for each pixel multiplied by a number of pixels per clock, hence 3×2=6, in other words, the number of the data output ports (data) is 6.

The frequency of the clock signal, or a clock rate of the conventional multistable display may be calculated with the following formula:

$$\text{clock rate (Hz)} = \left[\frac{\text{(resolution)}}{\text{(pixel per clock)}} + \text{(hold time)}\right] \times \frac{\text{(duty count)}}{T_{line})}$$

More particularly, when the resolution is 1920, the pixel per clock under SDR is 2, the hold time is configured as 1, the duty count is configured as 64, the transportation time ($T_{line}$) is configured as 5 ms, and the clock rate is obtained as shown in the following Table 1:

TABLE 1

| Resolution | Mode | Pixel per clock | Duty count | $T_{line}$ | Clock rate |
|---|---|---|---|---|---|
| Full HD (1920 × 1080) | SDR | 2 | 64 | 5(ms) | 12.314(MHz) |

As described earlier and in Table 1, when under Full HD resolution, the clock rate and the duty count are correlated. By having high clock rates, the conventional multistable display consumes a great amount of power; hence, the conventional multistable display consumes too much power with its high clock rates.

SUMMARY OF THE INVENTION

As most conventional multistable displays consume too much power with high clock rates, the present invention provides a multistable display driven at a lower clock rate. As a result, the multistable display of the present invention is able to decrease power consumption.

The multistable display includes a timing controller circuit (TCON), a driver circuit (Driver IC), and a panel.

The timing controller circuit generates a time controller signal. The driver circuit stores a voltage configuration truth table, and is connected to the timing controller circuit. The driver circuit receives the time controller signal. The panel is connected to the driver circuit.

The time controller signal includes a first data signal, and the first data signal includes a header setting data and a voltage waveform data. When the driver circuit receives the header setting data, the driver circuit configures the voltage configuration truth table according to the header setting data.

When the driver circuit receives the voltage waveform data, the driver circuit determines a driver voltage waveform outputted to the panel according to the voltage waveform data and the voltage configuration truth table.

As the driver circuit receives the voltage waveform data, the driver circuit determines the driver voltage waveform outputted to the panel according to the voltage waveform data and the voltage configuration truth table. For example, the voltage waveform data may be a 1-bit binary code, such that the driver circuit can determine a voltage of the driver voltage waveform by querying the voltage configuration truth table according to the 1-bit binary code of the voltage waveform data. In the conventional multistable displays, the voltage of the driver voltage waveform needs to be transmitted by 3-bit binary codes. However, in the multistable display of the present invention, the voltage of the driver voltage waveform needs to be transmitted by only 1-bit binary code. Further, since the voltage configuration truth table is configured by the header setting data, the voltage of the driver voltage waveform by querying the voltage configuration truth table can be modified. The present invention may therefore drastically decrease an amount of bits needed to transport. In comparison to the conventional multistable displays, under a same condition of transporting a same amount of bits within a same time, the present invention is able to drive the panel at a lower clock rate, thus decreasing a power consumption needed for driving the panel.

BRIEF DESCRIPTION OF THE DRAWINGS

FIG. 7C is a third schematic view of the content header setting data of the first data signal outputted by the first data signal output port (data 0) of the multistable display of the present invention.

DETAILED DESCRIPTION OF THE INVENTION

Figure 1:
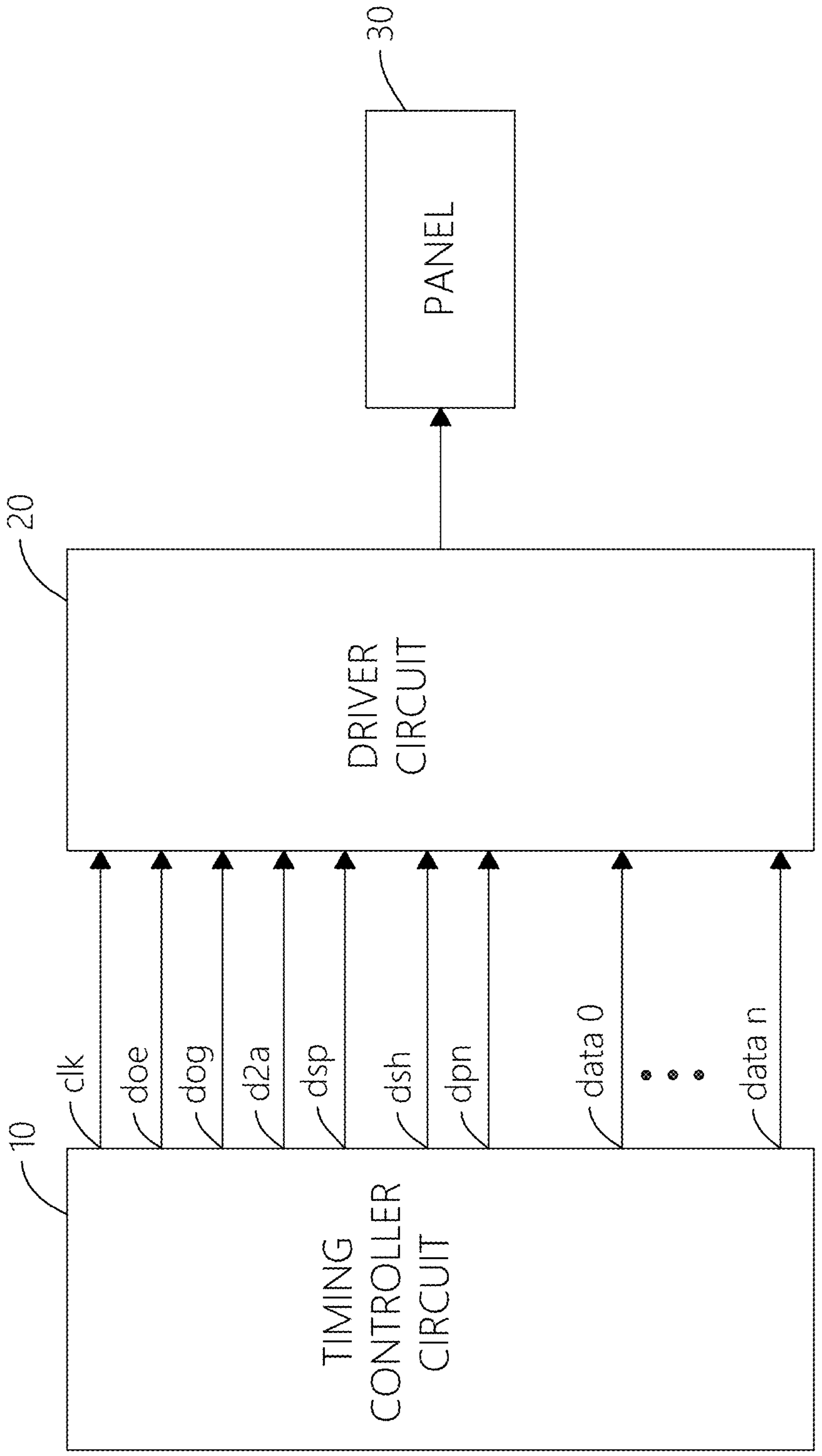
FIG. 1 is a block diagram of a multistable display of the present invention.

With reference to FIG. 1, a multistable display includes a timing controller circuit 10, a driver circuit 20, and a panel 30.

The timing controller circuit 10 generates a time controller signal. The driver circuit 20 stores a voltage configuration truth table, and is connected to the timing controller circuit 10. The driver circuit 20 receives the time controller signal. The panel 30 is connected to the driver circuit 20.

Figure 2A:
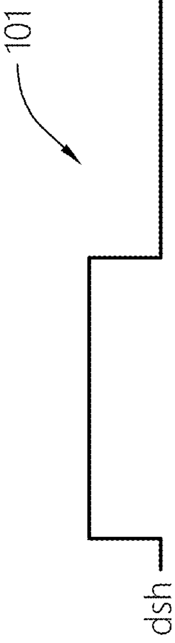
FIG. 2A is a waveform schematic view of a header setting signal outputted by a display setting header (dsh) control port of the multistable display of the present invention.
Figure 2B:
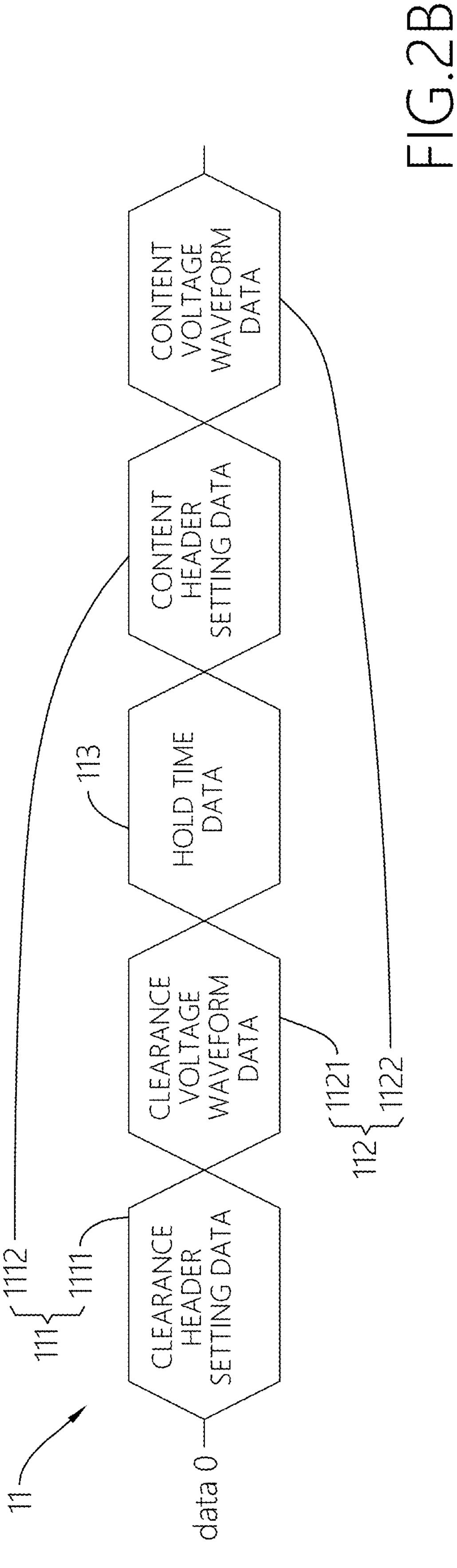
FIG. 2B is a schematic view of a first data signal outputted by a first data signal output port (data 0) of the multistable display of the present invention.

With reference to FIGS. 2A and 2B, the time controller signal includes a first data signal 11, and the first data signal 11 includes at least one header setting data 111 and at least one voltage waveform data 112. When the driver circuit 20 receives the at least one header setting data 111, the driver circuit 20 configures the voltage configuration truth table according to the at least one header setting data 111. When the driver circuit 20 receives the at least one voltage waveform data 112, the driver circuit 20 determines a driver voltage waveform outputted to the panel 30 according to the at least one voltage waveform data 112 and the voltage configuration truth table.

Since the driver circuit 20 determines the driver voltage waveform outputted to the panel 30 according to the at least one voltage waveform data 112 and the voltage configuration truth table, the driver circuit 20 can determine the voltage of the driver voltage waveform by querying the voltage configuration truth table according to a 1-bit binary code of the at least one voltage waveform data 112. Namely, the driver circuit 20 may not need to transmit content of a voltage value of the driver voltage waveform, and the driver circuit 20 may just transmit the 1-bit binary code of the at least one voltage waveform data 112.

In a conventional multistable display, the content of the voltage value of the driver voltage waveform needs to be transmitted by 3-bit binary codes. However, in the multistable display of the present invention, the voltage value of the driver voltage waveform just needs to be transmitted by only 1-bit binary code. Further, since the voltage configuration truth table is configured by the at least one header setting data 111, the voltage of the driver voltage waveform by querying the voltage configuration truth table can be modified. The present invention may therefore drastically decrease an amount of bits needed to transport. In comparison to the conventional multistable display, under a same condition of transporting a same amount of bits within a same time, the present invention is able to drive the panel at a lower clock rate, thus decreasing power consumption needed for driving the panel.

Moreover, the at least one header setting data 111 includes a clearance header setting data 1111 and a content header setting data 1112. The at least one voltage waveform data 112 includes a clearance voltage waveform data 1121 and a content voltage waveform data 1122. The first data signal 11 includes the clearance header setting data 1111, the clearance voltage waveform data 1121, the content header setting data 1112, and the content voltage waveform data 1122 arranged in sequence.

In one embodiment, the first data signal 11 further includes a hold time data 113, and the hold time data 113 is configured between the clearance voltage waveform data 1121 and the content header setting data 1112. Namely, the first data signal 11 may include the clearance header setting data 1111, the clearance voltage waveform data 1121, the hold time data 113, the content header setting data 1112, and the content voltage waveform data 1122 arranged in sequence.

More particularly, with reference to FIG. 1, the timing controller circuit 10 includes a clock (clk) signal output port, a display output enable (doe) control port, a display output ground (dog) control port, a digital to analog (d2*a*) control port, and a display start pulse (dsp) control port. The clk signal output port, the doe control port, the dog control port, the d2*a* control port, and the dsp control port of the timing controller circuit 10 are functionally identical with those on a timing controller circuit of the conventional multistable display described in the prior art, and thus further detailed description is omitted.

The timing controller circuit 10 may also include a display setting header (dsh) control port, a display positive-negative (dpn) control port, and a first data signal output port (data 0). In other embodiments, the timing controller circuit may include a plurality of data output ports (data 0 to data n), such as a first data output port (data 0) to a $(n+1)^{th}$ data output port (data n), and n is free to be any positive integer. For ease of demonstrating the technical features of the present invention, in the present embodiment, an example of having the first data output port (data 0) is chosen for the following parts of the detailed description.

The dsh control port is connected to the driver circuit 20, and the dsh control port outputs a header setting signal 101 to the driver circuit 20. The dpn control port is connected to the driver circuit 20, and the dpn control port outputs a positive-negative signal 102 to the driver circuit 20. The first data output port (data 0) is connected to the driver circuit 20 for outputting the first data signal 11 to the driver circuit 20.

With reference to FIGS. 2A and 2B, when the first data signal 11 outputted from the first data output port (data 0) is the clearance header setting data 1111, the dsh control port outputs the header setting signal 101 at a high voltage. When the first data signal 11 outputted from the first data output port (data 0) is the content header setting data 1112, the dsh control port outputs the header setting signal 101 at the high voltage. When the first data signal 11 outputted from the first data output port (data 0) is neither the clearance header setting data 1111 nor the content header setting data 1112, the dsh control port outputs the header setting signal 101 at a low voltage.

In other words, whenever the dsh control port outputs the header setting signal 101 at the high voltage, the first data signal 11 outputted from the first data output port (data 0) would be either the clearance header setting data 1111 or the content header setting data 1112. As such, the driver circuit 20 is able to determine whether the first data signal 11 currently receiving is the header setting data 111 according to a voltage of the header setting signal 101, and the driver circuit 20 can configure the voltage configuration truth table according to the header setting data 111.

Figure 3A:
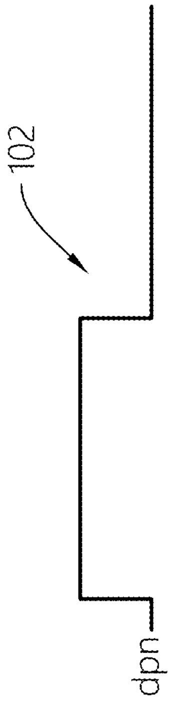
FIG. 3A is a waveform schematic view of a positive-negative signal outputted by a display positive-negative (dpn) control port of the multistable display of the present invention.
Figure 3B:
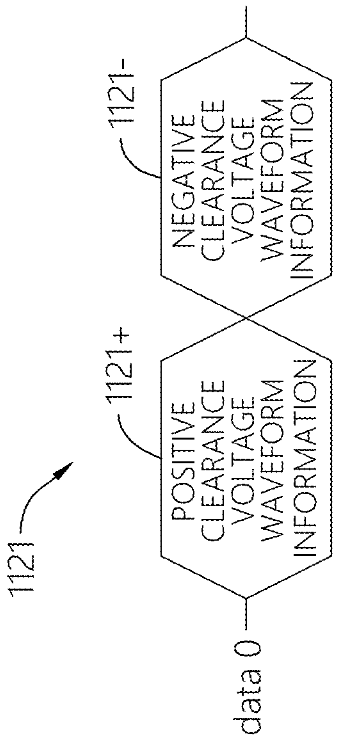
FIG. 3B is a schematic view of a clearance voltage waveform data of the first data signal outputted by the first data signal output port (data 0) of the multistable display of the present invention.

With reference to FIGS. 3A and 3B, the clearance voltage waveform data 1121 includes a positive clearance voltage waveform information 1121+ and a negative clearance voltage waveform information 1121−. When the first data signal 11 outputted by the first data output port (data 0) is the positive clearance voltage waveform information 1121+, the dpn control port outputs the positive-negative signal 102 at the high voltage. Further, since the first data signal 11 outputted from the first data output port (data 0) is neither the clearance header setting data 1111 nor the content header setting data 1112, the dsh control port outputs the header setting signal 101 at the low voltage.

Moreover, when the first data signal 11 outputted by the first data output port (data 0) is the negative clearance voltage waveform information 1121−, the dpn control port outputs the positive-negative signal 102 at the low voltage. Similarly, since the first data signal 11 outputted from the first data output port (data 0) is neither the clearance header setting data 1111 nor the content header setting data 1112, the dsh control port outputs the header setting signal 101 at the low voltage.

Figure 4A:
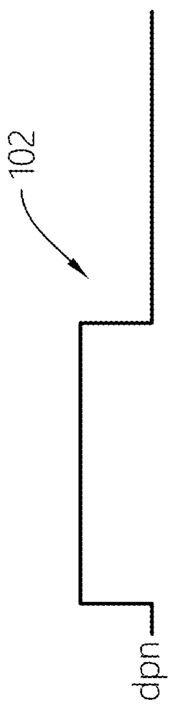
FIG. 4A is a waveform schematic view of the positive-negative signal outputted by the dpn control port of the multistable display of the present invention.
Figure 4B:
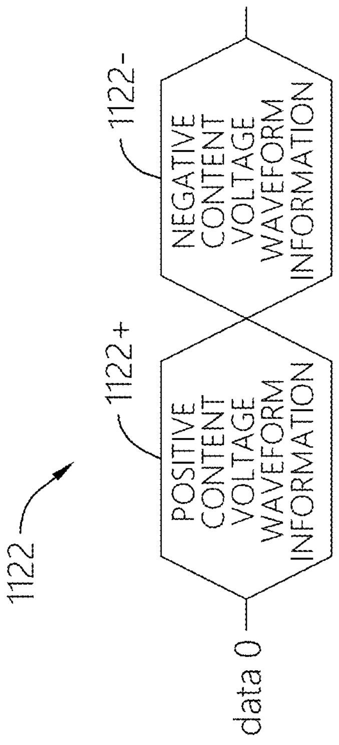
FIG. 4B is a schematic view of a content voltage waveform data of the first data signal outputted by the first data signal output port (data 0) of the multistable display of the present invention.

With reference to FIGS. 4A and 4B, the content voltage waveform data 1122 includes a positive content voltage waveform information 1122+ and a negative content voltage waveform information 1122−. When the first data signal 11 outputted by the first data output port (data 0) is the positive content voltage waveform information 1122+, the dpn control port outputs the positive-negative signal 102 at the high voltage. Further, since the first data signal 11 outputted from the first data output port (data 0) is neither the clearance header setting data 1111 nor the content header setting data 1112, the dsh control port outputs the header setting signal 101 at the low voltage.

Moreover, when the first data signal 11 outputted by the first data output port (data 0) is the negative content voltage waveform information 1122–, the dpn control port outputs the positive-negative signal 102 at the low voltage. Similarly, since the first data signal 11 outputted from the first data output port (data 0) is neither the clearance header setting data 1111 nor the content header setting data 1112, the dsh control port outputs the header setting signal 101 at the low voltage.

In the embodiment, the first data signal 11 outputted by the first data output port (data 0) and the positive-negative signal 102 outputted by the dpn control port are utilized as inputs of the voltage configuration truth table. When the driver circuit 20 configures the voltage configuration truth table according to the header setting data 111, the header setting data 111 is utilized as outputs of the voltage configuration truth table.

In an example, the multistable display is configured to display Full HD resolution of 1920×1080. When using single data rate (SDR) for transporting data, each cycle of the clock signal is able to include and transport data for one pixel, thus in other words, the pixel per clock is 1. Furthermore, a transportation time ($T_{line}$) is configured to be 5 milliseconds (ms).

Since the driver circuit 20 determines the driver voltage waveform according to the voltage waveform data 112 and the voltage configuration truth table, the driver circuit 20 may just transmit the 1-bit binary code of the voltage waveform data. Namely, data of each pixel of the multistable display can be transmitted by the 1-bit binary code. Moreover, the timing controller circuit 10 has already included one signal output port, such as the clk signal output port, and six control ports, such as the doe control port, the dog control port, the d2*a* control port, the dsp control port, the dsh control port, and the dpn control port. If the multistable display still includes 11 ports same as the conventional multistable display, an amount of the data output ports may be 4, such as a first to a fourth data output port (data 0 to data 3).

Further, since the data of each pixel of the multistable display is transmitted by the 1-bit binary code and the amount of the data output ports is 4, the pixel per clock can be calculated to be 4. For example, 1×a=4, a=4. In the pervious formula, the parameter "a" is the pixel per clock.

A clock rate of the multistable display is calculated with the following formula:

$$\text{clock rate (Hz)} = \left[\frac{\text{(resolution)}}{\text{(pixel per clock)}} + \text{(hold time)}\right] \times \frac{\text{(duty count)}}{(T_{line})}$$

More particularly, when the resolution is 1920, the pixel per clock under SDR is 4, the hold time is configured as 1, the duty count is configured as 64, the transportation time ($T_{line}$) is configured as 5 ms, and the clock rate is obtained as shown in the following Table 2:

TABLE 2

| Resolution | Mode | Pixel per clock | Duty count | $T_{line}$ | Clock rate |
|---|---|---|---|---|---|
| Full HD (1920 × 1080) | SDR | 4 | 64 | 5(ms) | 6.157(MHz) |

Comparing Table 1 and Table 2, the clock rate of the multistable display is lower than a clock rate of the conventional multistable display, and thus the multistable display of the present invention is able to decrease power consumption.

Figure 5A:
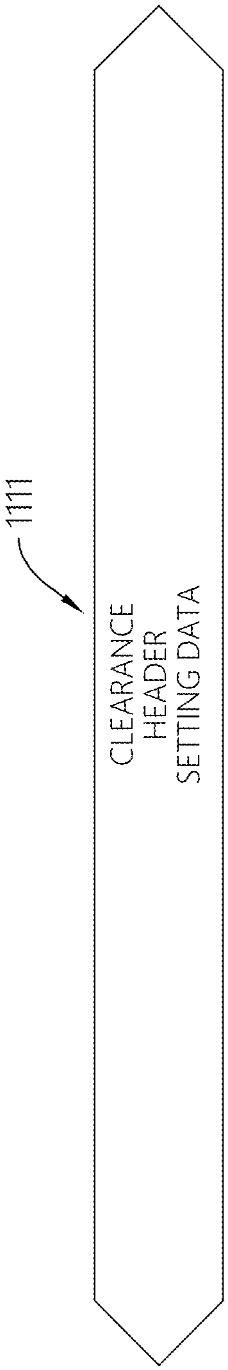
FIG. 5A is a first schematic view of a clearance header setting data of the first data signal outputted by the first data signal output port (data 0) of the multistable display of the present invention.
Figure 5B:
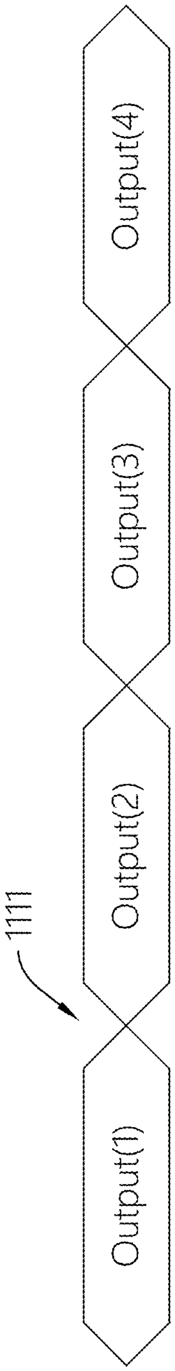
FIG. 5B is a second schematic view of the clearance header setting data of the first data signal outputted by the first data signal output port (data 0) of the multistable display of the present invention.
Figure 5C:
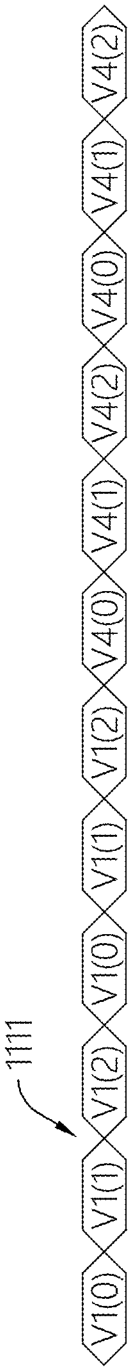
FIG. 5C is a third schematic view of the clearance header setting data of the first data signal outputted by the first data signal output port (data 0) of the multistable display of the present invention.

With reference to FIGS. 5A to 5C, since the header setting data 111 is utilized as the outputs of the voltage configuration truth table, the outputs of the voltage configuration truth table configured by the clearance header setting data 1111 includes 4 kinds of output values, such as output (1) to output (4). Further, since the voltage of the driver voltage waveform of the conventional multistable display needs to be transmitted by 3-bit binary codes, each kind of the output values, such as output (1) to output (4), is presented in 3-bit binary codes. For example, as shown in FIGS. 5B and 5C, a first kind of the output value, such as output (1), is presented in 3-bit binary code, respectively as V1(0) to V1(2), for corresponding to a first voltage V1. Further, since the first data signal 11 outputted by the first data output port (data 0) and the positive-negative signal 102 outputted by the dpn control port are utilized as the inputs of the voltage configuration truth table, the voltage configuration truth table can be obtained as shown in the following Table 3:

TABLE 3

| first data output port (data 0) | dpn control port | output(1)~(4) |
|---|---|---|
| 1 | 1 | V1(0)(1)(2) |
| 0 | 1 | V1(0)(1)(2) |
| 1 | 0 | V4(0)(1)(2) |
| 0 | 0 | V4(0)(1)(2) |

Moreover, voltages for clearing may be a maximum positive voltage or a minimum negative voltage. For example, the maximum positive voltage is the first voltage V1, and the minimum negative voltage is a fourth voltage V4. Therefore, the voltage configuration truth table configured by the clearance header setting data 1111 only includes the first voltage V1 and the fourth voltage V4. Namely, the 4 kinds of output values, such as output (1) to output (4), only need to be set as the first voltage V1 and the fourth voltage V4. For example, the output (1) and the output (2) are both set as the first voltage V1, and the output (3) and the output (4) are both set as the fourth voltage V4.

With reference to FIGS. 6A to 6D, the clearance voltage waveform data 1121 includes the positive clearance voltage waveform information 1121+ and the negative clearance voltage waveform information 1121–. Further, the positive clearance voltage waveform information 1121+ and the negative clearance voltage waveform information 1121– respectively include first pixel information 1121*a* and second pixel information 1121*b*. The first pixel information 1121*a* drives a first pixel of the panel 30, and the second pixel information 1121*b* drives a second pixel of the panel 30.

However, with reference to the voltage configuration truth table shown in Table 3, the output (1) and the output (2) are both set as the first voltage V1 and the output (3) and the output (4) are both set as the fourth voltage V4. As shown in FIG. 6D, when the dpn control port outputs the positive-negative signal 102 at the high voltage representing a digital "1", no matter what the first data signal 11 outputted by the first data output port (data 0) is, the driver circuit 20 outputs the driver voltage waveform with the first voltage V1 to the panel 30. Similarly, when the dpn control port outputs the positive-negative signal 102 at the low voltage representing a digital "0", no matter what the first data signal 11 outputted by the first data output port (data 0) is, the driver circuit 20 outputs the driver voltage waveform with the fourth voltage V4 to the panel 30.

Figure 6A:
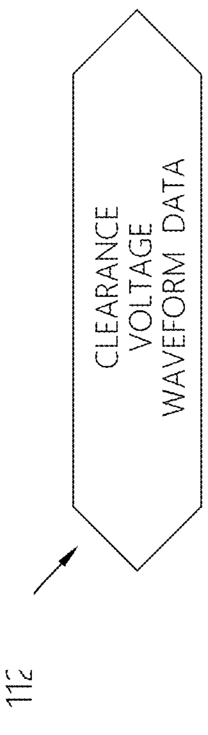
FIG. 6A is a first schematic view of a clearance voltage waveform data of the first data signal outputted by the first data signal output port (data 0) of the multistable display of the present invention.
Figure 6B:
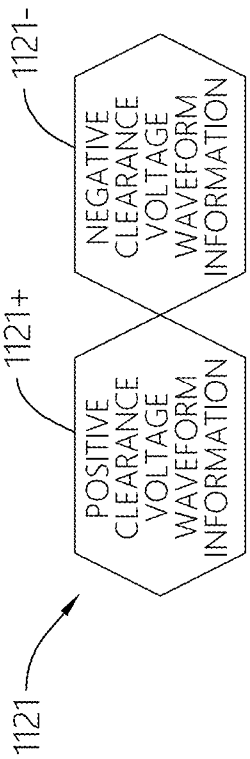
FIG. 6B is a second schematic view of the clearance voltage waveform data of the first data signal outputted by the first data signal output port (data 0) of the multistable display of the present invention.
Figure 6C:
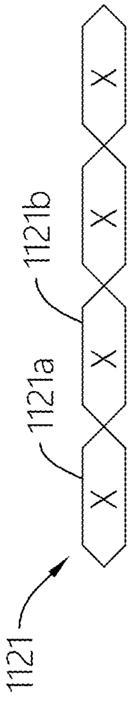
FIG. 6C is a third schematic view of the clearance voltage waveform data of the first data signal outputted by the first data signal output port (data 0) of the multistable display of the present invention.
Figure 6D:
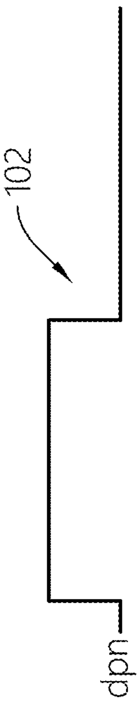
FIG. 6D is a waveform schematic view of the positive-negative signal outputted by the dpn control port of the multistable display of the present invention.

Therefore, as shown in FIG. 6C, the first data signal 11 outputted by the first data output port (data 0) is represented as "X", which means the driver voltage waveform outputted by the driver circuit 20 is not influenced by the first data signal 11 outputted by the first data output port (data 0).

Figure 7A:
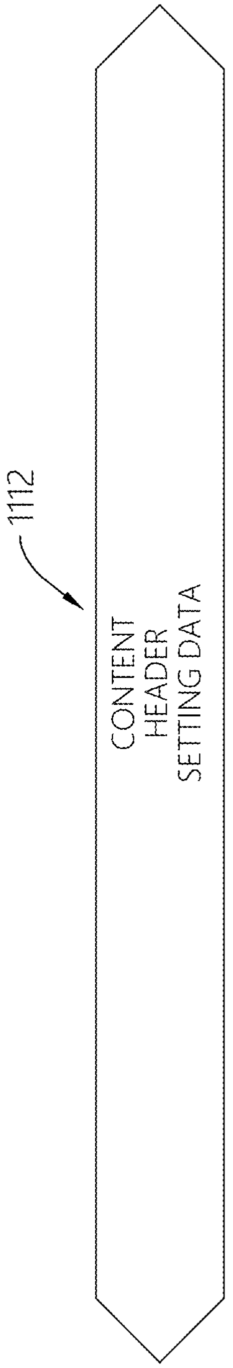
FIG. 7A is a first schematic view of a content header setting data of the first data signal outputted by the first data signal output port (data 0) of the multistable display of the present invention.
Figure 7B:
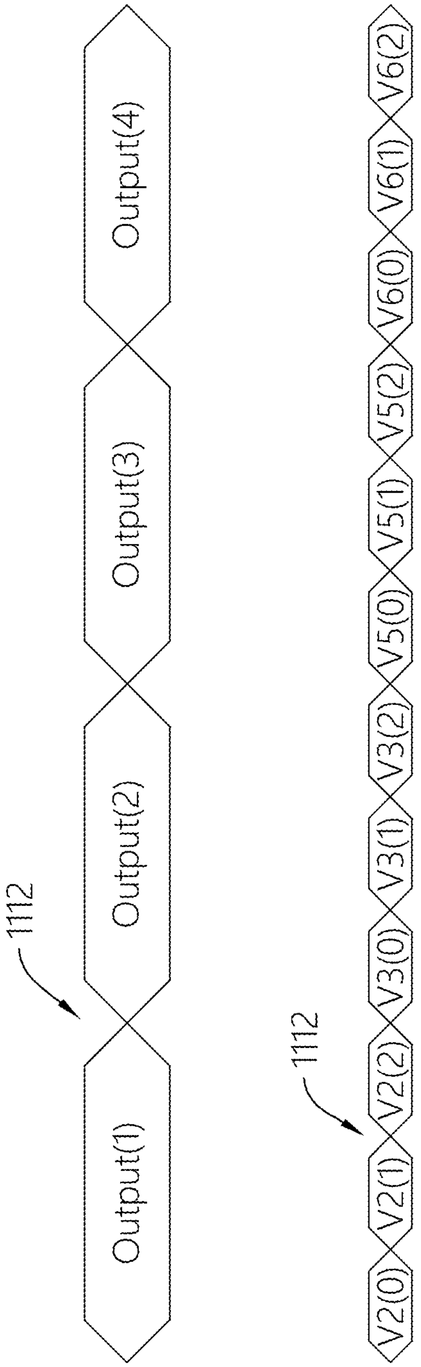
FIG. 7B is a second schematic view of the content header setting data of the first data signal outputted by the first data signal output port (data 0) of the multistable display of the present invention.

With reference to FIGS. 7A to 7C, the outputs of the voltage configuration truth table configured by the content header setting data 1112 also include 4 kinds of output values, such as output (1) to output (4). Similarly, since the voltage of the driver voltage waveform of the conventional multistable display needs to be transmitted by 3-bit binary codes, each kind of the output values, such as output (1) to output (4), is presented in 3-bit binary codes. For example, as shown in FIGS. 7B and 7C, the output (1) is presented in 3-bit binary code, respectively as V2(0) to V2(2), for corresponding to a second voltage V2. The output (2) is also presented in 3-bit binary code, respectively as V3(0) to V3(2), for corresponding to a third voltage V3. The output (3) is also presented in 3-bit binary code, respectively as V5(0) to V5(2), for corresponding to a fifth voltage V5. The output (4) is also presented in 3-bit binary code, respectively as V6(0) to V6(2), for corresponding to a sixth voltage V6. Further, since the first data signal 11 outputted by the first data output port (data 0) and the positive-negative signal 102 outputted by the dpn control port are utilized as the inputs of the voltage configuration truth table, the voltage configuration truth table configured by the content header setting data 1112 can be obtained as shown in the following Table 4:

TABLE 4

| first data output port (data 0) | dpn control port | output(1)~(4) |
|---|---|---|
| 1 | 1 | V2(0)(1)(2) |
| 0 | 1 | V3(0)(1)(2) |
| 1 | 0 | V5(0)(1)(2) |
| 0 | 0 | V6(0)(1)(2) |

Moreover, voltages for displaying may be 4 kinds of voltages, for example, the second voltage V2, the third voltage V3, the fifth voltage V5, and the sixth voltage V6. Therefore, the voltage configuration truth table configured by the content header setting data 1112 includes the second voltage V2, the third voltage V3, the fifth voltage V5, and the sixth voltage V6. Namely, the 4 kinds of output values, such as output (1) to output (4), need to be set as the second voltage V2, the third voltage V3, the fifth voltage V5, and the sixth voltage V6, respectively. For example, the output (1) is set as the second voltage V2, the output (2) is set as the third voltage V3, the output (3) is set as the fifth voltage V5, and the output (4) is set as the sixth voltage V6.

With reference to FIGS. 8A to 8D, the content voltage waveform data 1122 includes the positive content voltage waveform information 1122+ and the negative content voltage waveform information 1122−. Further, the positive content voltage waveform information 1122+ and the negative content voltage waveform information 1122− respectively include first pixel information **1122*a* and second pixel information 1122*b*. The first pixel information 1122*a* drives the first pixel of the panel 30, and the second pixel information 1122*b* drives the second pixel of the panel 30**.

Figures 8A, 8B, 8C, 8D:
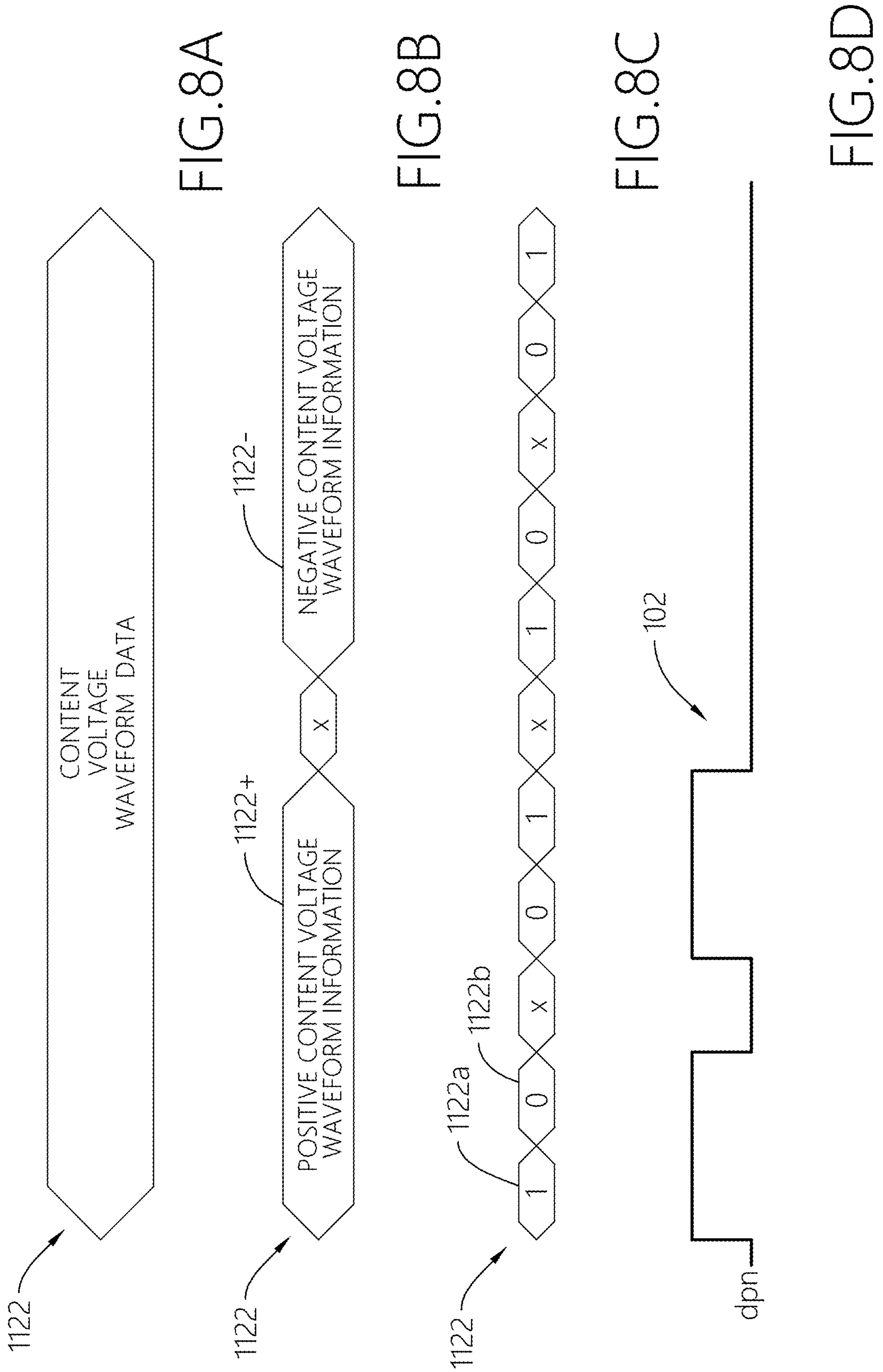
FIG. 8A is a first schematic view of a content voltage waveform data of the first data signal outputted by the first data signal output port (data 0) of the multistable display of the present invention.
FIG. 8B is a second schematic view of the content voltage waveform data of the first data signal outputted by the first data signal output port (data 0) of the multistable display of the present invention.
FIG. 8C is a third schematic view of the content voltage waveform data of the first data signal outputted by the first data signal output port (data 0) of the multistable display of the present invention.
FIG. 8D is a waveform schematic view of the positive-negative signal outputted by the dpn control port of the multistable display of the present invention.

For example, with reference to the voltage configuration truth table shown in Table 4, as shown in FIG. 8C, when the first data output port (data 0) outputs the first data signal 11 at the high voltage representing the digital "1" and the dpn control port outputs the positive-negative signal 102 at the high voltage representing the digital "1", the driver circuit 20 outputs the driver voltage waveform with the second voltage V2 to the panel 30. Similarly, when the first data output port (data 0) outputs the first data signal 11 at the low voltage representing the digital "0" and the dpn control port outputs the positive-negative signal 102 at the high voltage representing the digital "1", the driver circuit 20 outputs the driver voltage waveform with the third voltage V3 to the panel 30.

Figure 9A:
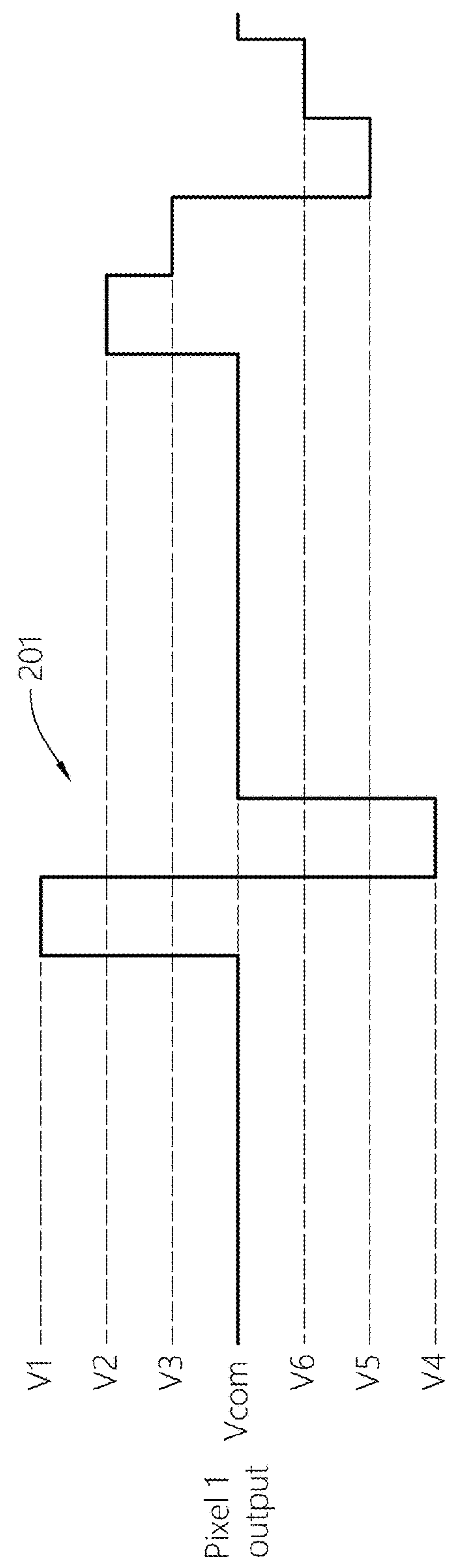
FIG. 9A is a waveform schematic view of a driver voltage waveform outputted to a first pixel from the driver circuit of the multistable display of the present invention.
Figure 9B:
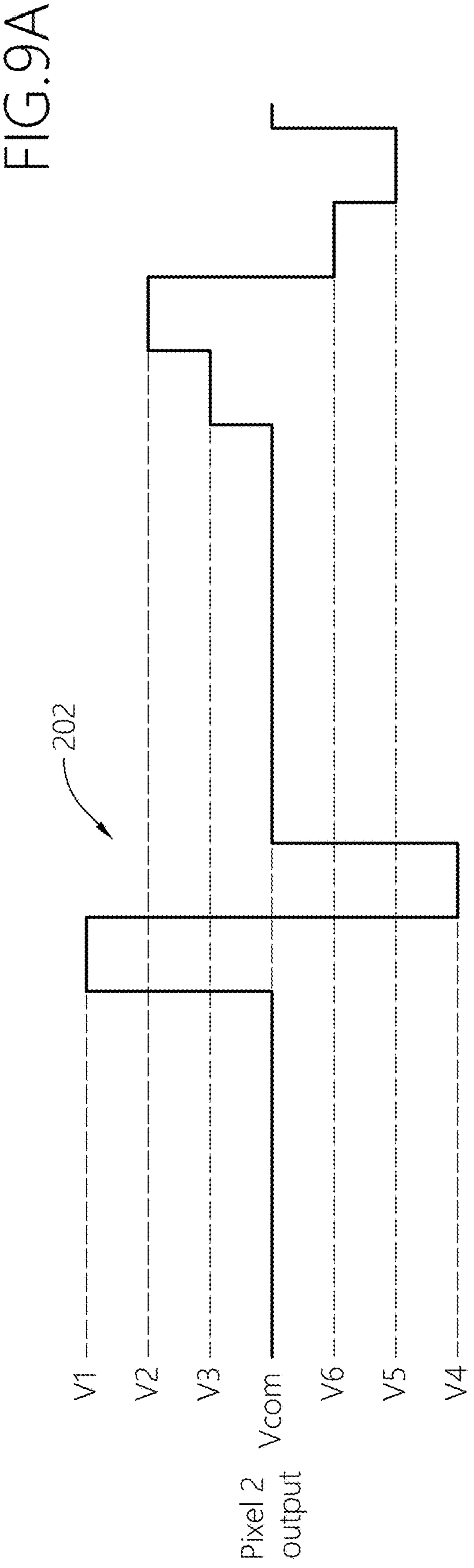
FIG. 9B is a waveform schematic view of a driver voltage waveform outputted to a second pixel from the driver circuit of the multistable display of the present invention.

Therefore, the driver circuit 20 can configure the voltage configuration truth table according to the clearance header setting data 1111 or the content header setting data 1112, such as table 3 or table 4. The driver circuit 20 can further determine the driver voltage waveform outputted to the panel 30 according to the clearance voltage waveform data 1121, the content voltage waveform data 1122, and the voltage configuration truth table, such as table 3 or table 4. For example, with reference to FIGS. 9A and 9B, FIG. 9A is a waveform schematic view of the driver voltage waveform 201 outputted to the first pixel from the driver circuit 20. FIG. 9B is a waveform schematic view of the driver voltage waveform outputted to the second pixel from the driver circuit 20.

Even though numerous characteristics and advantages of the present invention have been set forth in the foregoing description, together with details of the structure and function of the invention, the disclosure is illustrative only.

Changes may be made in detail, especially in matters of shape, size, and arrangement of parts within the principles of the invention to the full extent indicated by the broad general meaning of the terms in which the appended claims are expressed.

What is claimed is:

1. A multistable display, comprising:

a timing controller circuit, generating a time controller signal;

a driver circuit, storing a voltage configuration truth table, connected to the timing controller circuit, and receiving the time controller signal; and a panel, connected to the driver circuit;

wherein the time controller signal comprises a first data signal, and the first data signal comprises at least one header setting data and at least one voltage waveform data;

wherein when the driver circuit receives the at least one header setting data, the driver circuit configures the voltage configuration truth table according to the at least one header setting data;

wherein when the driver circuit receives the at least one voltage waveform data, the driver circuit determines a driver voltage waveform outputted to the panel according to the at least one voltage waveform data and the voltage configuration truth table.

2. The multistable display as claimed in claim 1, wherein the at least one header setting data comprises a clearance header setting data and a content header setting data, and the at least one voltage waveform data comprises a clearance voltage waveform data and a content voltage waveform data;

wherein the first data signal comprises the clearance header setting data, the clearance voltage waveform data, the content header setting data, and the content voltage waveform data arranged in sequence.

3. The multistable display as claimed in claim 2, wherein the first data signal further comprises a hold time data, and the hold time data is configured between the clearance voltage waveform data and the content header setting data.

4. The multistable display as claimed in claim 2, wherein the timing controller circuit comprises:

a header setting control port, connected to the driver circuit, and outputting a header setting signal to the driver circuit;

a display positive-negative control port, connected to the driver circuit, and outputting a positive-negative signal to the driver circuit; and a first data signal output port, connected to the driver circuit, and outputting the first data signal to the driver circuit;

wherein when the first data signal outputted from the first data signal output port is the clearance header setting data, the header setting signal outputted from the header setting control port is at a high voltage.

5. The multistable display as claimed in claim 4, wherein the clearance voltage waveform data comprises positive clearance voltage waveform information and negative clearance voltage waveform information;

wherein when the first data signal outputted from the first data signal output port is the positive clearance voltage waveform information, the header setting signal outputted from the header setting control port is at a low voltage, and the positive-negative signal outputted from the display positive-negative control port is at the high voltage.

6. The multistable display as claimed in claim 5, wherein when the first data signal outputted from the first data signal output port is the negative clearance voltage waveform information, the header setting signal outputted from the header setting control port is at the low voltage, and the positive-negative signal outputted from the display positive-negative control port is at the low voltage.

7. The multistable display as claimed in claim 4, wherein when the first data signal outputted from the first data signal output port is the content header setting data, the header setting signal outputted from the header setting control port is at the high voltage.

8. The multistable display as claimed in claim 7, wherein the content voltage waveform data comprises positive content voltage waveform information and negative content voltage waveform information;

wherein when the first data signal outputted from the first data signal output port is the positive content voltage waveform information, the header setting signal outputted from the header setting control port is at the low voltage, and the positive-negative signal outputted from the display positive-negative control port is at the high voltage.

9. The multistable display as claimed in claim 8, wherein when the first data signal outputted from the first data signal output port is the negative content voltage waveform information, the header setting signal outputted from the header setting control port is at the low voltage, and the positive-negative signal outputted from the display positive-negative control port is at the low voltage.

10. The multistable display as claimed in claim 4, wherein the first data signal outputted by the first data output port and the positive-negative signal outputted by the display positive-negative control port are utilized as inputs of the voltage configuration truth table;

wherein when the driver circuit configures the voltage configuration truth table according to the at least one header setting data, the at least one header setting data is utilized as outputs of the voltage configuration truth table.

* * * * *